United States Patent [19]
Shimoyama

[11] Patent Number: 5,893,548
[45] Date of Patent: Apr. 13, 1999

[54] MOUNTING STRUCTURE FOR MECHANISM ELEMENT

[75] Inventor: Koichi Shimoyama, Kanagawa, Japan

[73] Assignee: Mitsumi Electric Co., Ltd., Tokyo, Japan

[21] Appl. No.: 08/655,186

[22] Filed: May 30, 1996

[30] Foreign Application Priority Data

May 31, 1995 [JP] Japan .................. 7-158708

[51] Int. Cl.$^6$ ........................................ F16M 1/00
[52] U.S. Cl. ........................................ 248/628
[58] Field of Search .................... 248/628, 225.11, 248/225.21, 223.31, 227.2, 678, 222.51, 27.1, 27.3; 361/809, 810, 811; 174/66; 403/49, 112, 326

[56] References Cited

U.S. PATENT DOCUMENTS

| | | | |
|---|---|---|---|
| 1,935,354 | 11/1933 | Dressel | 361/811 |
| 2,880,262 | 3/1959 | Bell et al. | 248/27.3 X |
| 4,576,302 | 3/1986 | Smolik | 248/223.31 X |
| 4,719,542 | 1/1988 | Lemmer | 361/811 |

*Primary Examiner*—Ramon O. Ramirez
*Assistant Examiner*—Robert Lipcsik
*Attorney, Agent, or Firm*—Whitham, Curtis & Whitham

[57] ABSTRACT

A mount which is fixed to a retaining board is provided with a mounting surface on which a mechanism component consisting of a link mechanism and a solenoid is mounted; a first support leg having a vertical portion downwardly folded along one edge of the mounting surface and a horizontal attachment portion which is horizontally folded along the lower end of the vertical portion and is fixed to the retaining board with a screw; and a second support leg having a vertical portion downwardly folded along the other edge of the mounting surface and a holding edge which partially extends from a lower edge of the vertical portion and is horizontally folded.

18 Claims, 3 Drawing Sheets

FIG. 1(A)
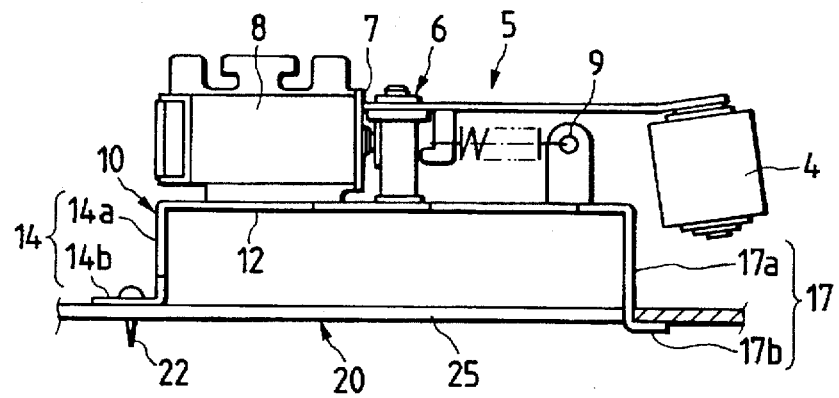
FIG. 1(B)
FIG. 1(C)
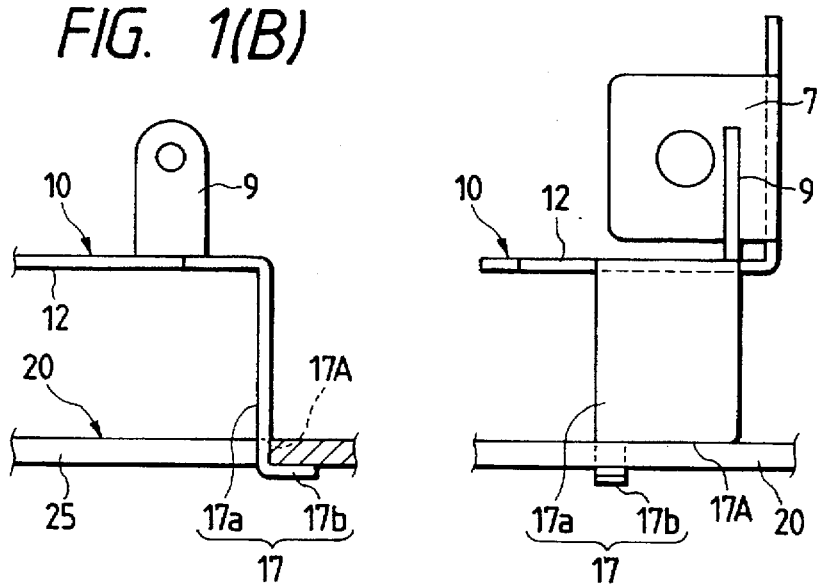
FIG. 1(D)
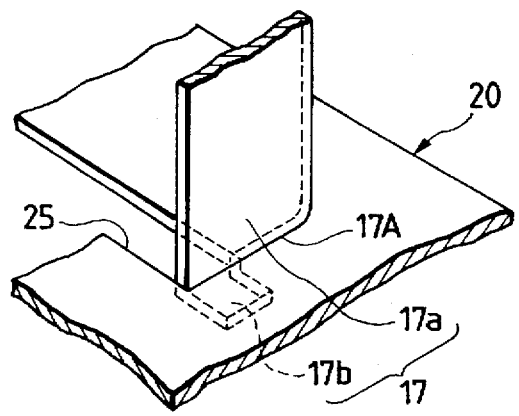

MOUNTING STRUCTURE FOR MECHANISM ELEMENT

BACKGROUND OF THE INVENTION

1. Field of the Invention

The present invention relates to a mounting structure for a mechanism element or mount mechanism elements, such as a motor and a solenoid actuator which actuate or drive links, cams, and rollers, on a retaining board disposed in a housing of equipment such as a video deck or a cassette deck.

2. Related Art

FIGS. 2 and 3 show one example of a conventional structure for mounting mechanism elements. In the illustrated example, a mechanism component 5 consisting of a link mechanism 6 and a solenoid 8 selectively bring a cleaning roller 4 used in, e.g., a tape traveling system of a video deck into pressed contact with, or detaches the same from, a drum 2. The mechanism component 5 is mounted on a retaining board 20 disposed in a housing via mounts 10A (FIG. 2) and 10B (FIG. 3) which are substantially bent into the shape of a letter C and are resiliently deflective.

The mount 10A shown in FIG. 2 is provided with a mounting surface 12 on which the mechanism component 5 is mounted, a first support leg 14 and a second support leg 15. The first support leg 14 comprises a vertical side 14a folded down along one edge of the mounting surface 12 and a horizontal attachment portion 14b which is horizontally folded along the lower end of the vertical side and is fixed to the retaining board 20 with a screw 22. The second support leg 15 has a vertical side folded downward along the other edge of the mounting surface 12, and a lower end 15A of the vertical side is inserted into an insertion aperture 23 formed in the retaining board 20.

The mount shown in FIG. 3 has a vertical side 16a folded downward along the other end of the mounting surface 12 as the first support leg 14 and a horizontal attachment portion 16b which is horizontally folded along the lower end of the vertical side 16a and is fixed to the retaining board 20 with a screw 24.

Of the above described conventional mounting structures for mechanism components, in the case of the mount shown in FIG. 2, the horizontal attachment portion 14b of the first support leg 14 is mounted to the retaining board 20 with the screw 22. However, the second support leg 15 has its lower end 15A only inserted into the insertion hole 23 formed in the retaining board 20. For this reason, it is impossible for the second support leg to control vertical movement, and the mechanism component as a whole may vertically vibrate depending on the operation of the mechanism component. As a result, the screw 22 may become loose and rattle.

On the other hand, in the case of the mount shown in FIG. 3, the first support leg 14 and the second support leg 16 are mounted to the retaining board 20 with the screws 22 and 24, which prevents vertical behaviors. However, it takes some effort and time to mount the mechanism component to the retaining board with two screws.

SUMMARY OF THE INVENTION

The present invention has been conceived to solve these drawbacks in the prior art, and the primary object of the present invention is to provide a mounting structure for a mechanism component which provides easy mounting operation and prevents problems, e.g., prevents a screw from becoming loose, by reliably suppressing undesirable movement.

To achieve this object, the present invention provides a mounting structure for a mechanism element which principally mounts a mechanism component on a retaining board via a mount, wherein the mount is substantially bent into the shape of a letter C so as to be resiliently deflective, as well as having a mounting surface on which the mechanism component is mounted, a first support leg consisting of a vertical portion folded downwardly along one end of the mounting surface and a horizontal attachment portion which is horizontally folded along the lower end of the vertical portion and is screwed to the retaining board, and a second support leg consisting of a vertical portion folded downwardly along the other end of the mounting surface and a holding edge which partially extends from the lower end of the vertical portion and is horizontally folded.

The holding edge is brought into contact with a lower surface of the retaining board through a cutout formed in the retaining board, so that the retaining board is pressed and held between the holding edge and the lower end of the vertical portion. As a result, the mount is attached to the retaining board.

The material of the mount is not limited to a particular substance. A suitable material may be selected from existing materials such as sheet metal and synthetic resins, allowing for the type of the mechanism component and usage environments.

In the mechanism component mounting structure of the present invention having the above described construction, the second support leg is deflected inwardly so that the holding edge can enter the cutout formed in the retaining board so as to be positioned below the lower surface of the retaining board. As a result of the deflected second support leg being resiliently returned to its original state, the cutout of the retaining board is pressed and held between the holding edge and the lower edge of the vertical portion. The horizontal attachment portion of the first support leg is then screwed to the retaining board (the first support leg and the second support leg may be fixed in a reverse order to the above described order). In this way, the attachment of the mount to the retaining board is now completed.

According to the mechanism component mounting structure of the present invention, the first support leg is fixed to the retaining board with the screw, and the second support leg is fixed in such a way that the lower end (the holding edge) of the second support leg holds the retaining board in a clamping manner. Consequently, it is possible to fix the second support leg to the retaining board with a single motion as well as to fix the mount with the use of only one screw. Further, it is possible to ensure the prevention of undesirable behaviors such as vertical vibrations, which makes it impossible for the screw to become loose.

BRIEF DESCRIPTION OF THE DRAWINGS

FIGS. 1A to 1D show a mechanism component mounting structure according to one embodiment of the present invention, wherein FIG. 1A is a side view of the overall mechanism component mounting structure, FIG. 1B is an enlarge side view of the principal components of the mechanism component mounting structure, FIG. 1C is an enlarge front view of the principal components, and FIG. 1D is an enlarged perspective view of the principal components;

DETAILED DESCRIPTION OF THE PREFERRED EMBODIMENTS

With reference to the accompanying drawings, an embodiment of the present invention will now be described.

Figure 2:
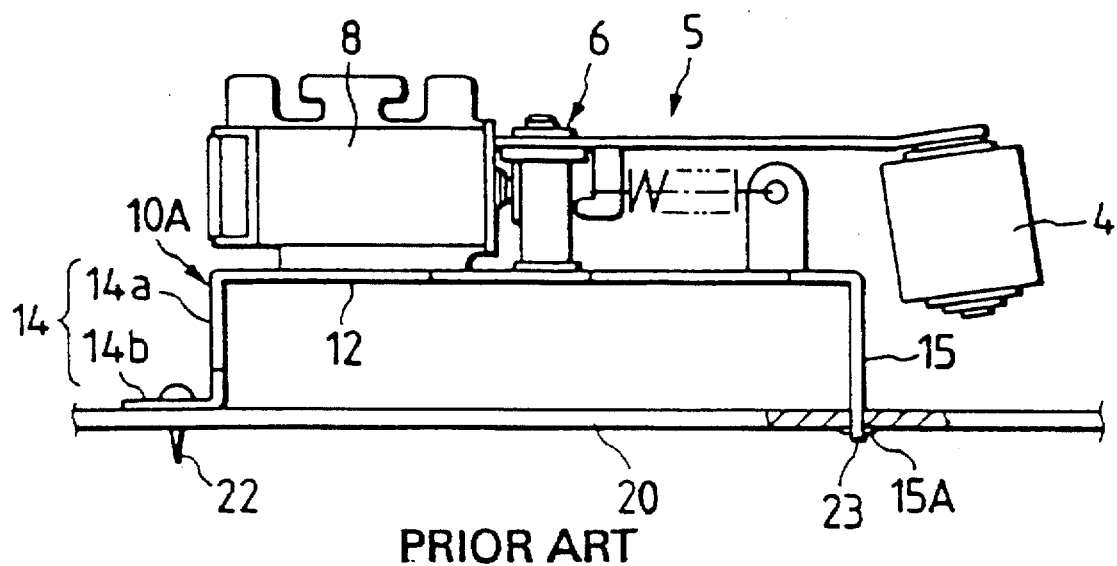
FIG. 2 is a side view showing the whole of a conventional mechanism component mounting structure.
Figure 3:
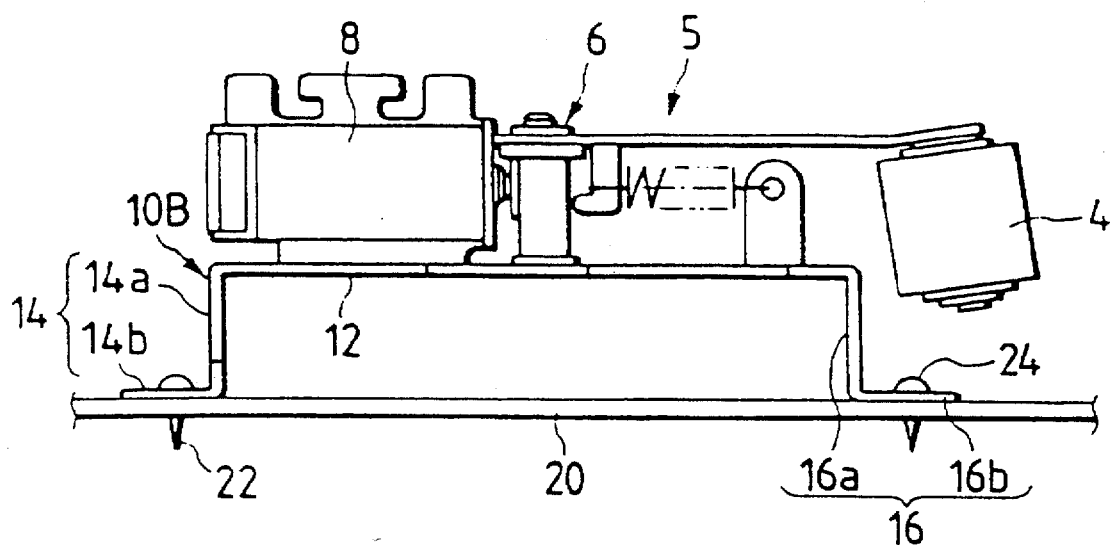
FIG. 3 is a side view showing the whole of another example of the conventional mechanism component mounting structure.
Figure 4:
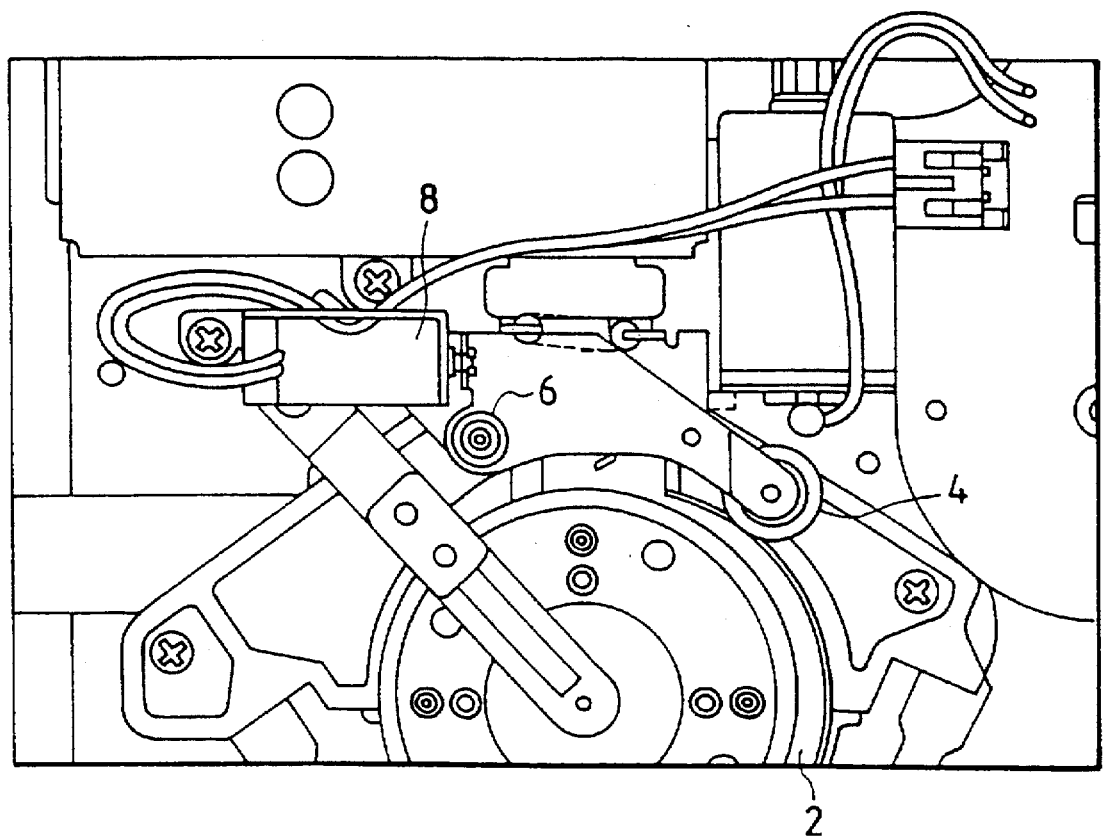
FIG. 4 is a partial front view showing the positional relationship between the conventional mechanism components and a drum.

FIG. 1 shows a mounting structure for a mechanism element according to one embodiment of the present invention. As with the previously described example shown in FIGS. 2 and 3, a mechanism component 5 consisting of a link mechanism 6 and a solenoid 8 selectively brings a cleaning roller 4 used in, e.g., a tape traveling system of a video deck into pressed contact with, or detaches the same from, a drum 2, in the present embodiment. The mechanism component 5 is mounted on a retaining board 20 disposed in a housing via a mount 10 which is bent substantially into the shape of a letter C and is resiliently deflective.

The mount 10 shown in the drawing is substantially formed into the shape of a letter C and is resiliently deflective. The mount 10 is provided with a plane mounting surface 12 on which brackets 7 and 9 are mounted for receiving the mechanism component 5 consisting of the link mechanism 6 and the solenoid 8; a first support leg 14 having a vertical portion 14a downwardly folded along one edge of the mounting surface 12 and a horizontal attachment portion 14b which is horizontally folded along the lower end of the vertical portion 14a and is fixed to the retaining board 20 with a screw 22; and a second support leg 17 having a vertical portion 17a downwardly folded along the other edge of the mounting surface 12 and a holding edge 17b which partially extends from a lower edge 17A of the vertical portion and is horizontally folded.

In the mechanism component mounting structure of the present invention having the above described construction, the second support leg 17 is deflected inwardly so that the holding edge 17b can enter a cutout 25 formed in the retaining board 20 so as to be positioned below the lower surface of the retaining board 20. As a result of the deflected second support leg 17 being resiliently returned to its original state, the cutout 25 (the peripheral edge) of the retaining board 20 is pressed and held between the holding edge 17b and the lower edge 17A of the vertical portion 17a. The horizontal attachment portion 14b of the first support leg 14 is then fixed to the retaining board 20 with the screw 22 (the first support leg 14 and the second support leg 17 may be fixed in a reverse order to the above described order). In this way, the attachment of the mount 10 to the retaining board 20 is now completed.

The first support leg 14 is fixed to the retaining board 20 with the screw 22, and the second support leg 17 is fixed in such a way that the lower end (the holding edge 17b) of the second support leg 17 holds the retaining board 20 in a clamped manner. Consequently, it is possible to fix the second support leg 17 to the retaining board 20 with a single action as well as to fix the mount 10 with the use of only one screw. Further, it is possible to ensure the prevention of undesirable behaviors such as vertical vibrations, which keeps the screw from becoming loose.

As can be understood from the above descriptions, by means of the mechanism component mounting structure of the present invention, the first support leg is fixed to the retaining board with the screw, and the second support leg is fixed in such a way that the lower end (the holding edge) of the second support leg holds the retaining board in a clamping manner. Consequently, it is possible to fix the second support leg to the retaining board with a single motion as well as to fix the mount with the use of only one screw. Further, it is possible to ensure the prevention of undesirable behaviors such as vertical vibrations, which keeps the screw from becoming loose.

What is claimed is:

1. A mounting structure for a mechanism element comprising:

a retaining board having a cutout;

a mount having a substantially "C" shape, said mount being resiliently deflective and including:

a mount surface capable of having said mechanism element mounted on one of an upper surface and a lower surface of said mount surface;

a first support leg, positioned at a first end of said mount surface, said first support leg including:

a first vertical portion positioned perpendicular to said mount surface having a first upper end adjacent said mount surface and a first lower end opposite said first upper end;

a first horizontal attachment portion positioned parallel to said mount surface and extending from the first lower end of the first vertical portion, said first horizontal attachment portion being fixed to an upper surface of said retaining board;

a second support leg including:

a second vertical portion positioned perpendicular to said mount surface having a second upper end adjacent said mount surface and a second lower end opposite said second upper end, said second vertical portion being longer than said first vertical portion by a width of said retaining board; and a holding edge extending from said second lower end of said second vertical portion and having an upper surface and a lower surface, said upper and lower surfaces being perpendicular to said second vertical portion and being parallel to said mount surface, said holding edge fitting within said cutout of said retaining board so that said upper surface contacts a lower surface of said retaining board and an edge portion of said cutout of said retaining board being pressed and held between said holding edge and said second lower end of said second vertical portion where said holding edge being bent toward said retaining board thereby eliminating vibrations on said mounting structure such that said first horizontal attachment portion remains fixed to the upper surface of said retaining board.

2. A mounting structure as in claim 1, wherein said first support leg and said second support leg are parallel.

3. A mounting structure as in claim 1, wherein said holding edge is perpendicular to said second vertical portion.

4. A mounting structure as in claim 1, wherein said second lower end of said second vertical portion has a second lower end surface parallel to said mounting surface, said second lower end surface having a third end adjacent said holding edge and a fourth end opposite said third end, wherein said fourth end contacts said retaining board.

5. A mounting structure as in claim 1, wherein said second support leg is attached to said retaining board only via said holding edge and said second vertical portion.

6. A mounting structure as in claim 1, wherein said mechanism element is adapted to include a unit that supports a magnetic tape.

7. A mounting structure as in claim 1, wherein said holding edge and said second vertical portion are for preventing vertical movement of said second support leg.

8. A mounting structure as in claim 1, wherein said second vertical portion has a width greater than that of said holding edge.

9. A mount for use with a structure for supporting a magnetic tape, said structure including a retaining board connected to said mount, said retaining board having a cutout, said structure further including a contacting unit directly connected to one of an upper side and a lower side of said mount, said contacting unit contacting a magnetic tape, said mount comprising:

a mounting surface for supporting said contacting means;

a first leg attached to said retaining board and having a vertical portion and a first horizontal attachment portion extending from said vertical portion and being fixed to an upper surface of said retaining board;

a second leg, parallel to said first leg, attached to said retaining board;

said second leg including a vertical portion perpendicular to said mounting surface, said vertical portion having a first end adjacent said mounting surface and a second end adjacent said retaining board, said vertical portion of said second leg being longer than said vertical portion of said first leg by a width of approximately said retaining board said second leg including a single holding edge extending from said second end and having an upper surface and a lower surface, said upper and lower surfaces being perpendicular to said vertical portion and extending from said second end of said vertical portion, an edge of said cutout of said retaining board being held and clamped between said holding edge and said second end of said vertical portion at said cutout and said holding edge being bent toward said retaining board whereby said upper surface contacts a lower surface of said retaining board and said holding edge eliminates vibrations on said mounting structure such that said first horizontal attachment portion remains fixed to the upper surface of said retaining board.

10. A mounting structure as in claim 9, wherein said second end of said vertical portion has a second end surface parallel to said mounting surface, said second end surface having a third end adjacent said holding edge and a fourth end opposite said third end, wherein said holding edge is positioned adjacent said third end, wherein said fourth end contacts said retaining board.

11. A mounting structure as in claim 9, wherein said second leg is clamped to said retaining board only by said holding edge and said second vertical portion.

12. A mounting structure as in claim 9, wherein said holding edge and said vertical portion are for preventing vertical movement of said second leg.

13. A mounting structure as in claim 9, wherein said vertical portion has a width greater than that of said holding edge.

14. A mounting structure as in claim 9, wherein said contacting unit includes:

a solenoid connected to said mounting surface, a linking unit connected to said solenoid, and a cleaning roller connected to said linking unit.

15. A mounting structure as in claim 9, wherein said mounting surface, said first leg and said second leg comprise a single continuous, substantially "C"-shaped, metallic member.

16. A mounting structure as in claim 9, further comprising a screw for attaching said first leg to said retaining board.

17. A mounting structure as in claim 9, wherein said cutout has a width substantially the same as a width of said holding edge, such that said holding edge fits within said cutout.

18. A mounting structure as in claim 9, wherein said contacting unit produces vibrations, and said holding edge and said second end of said vertical portion include a preventing unit that prevents said vibrations from causing relative movement between said retaining board and said second leg.

* * * * *